J. ABSTERDAM.
PROCESS OF DESULPHURIZING ORES.
No. 52,120.  Patented Jan. 23, 1866.
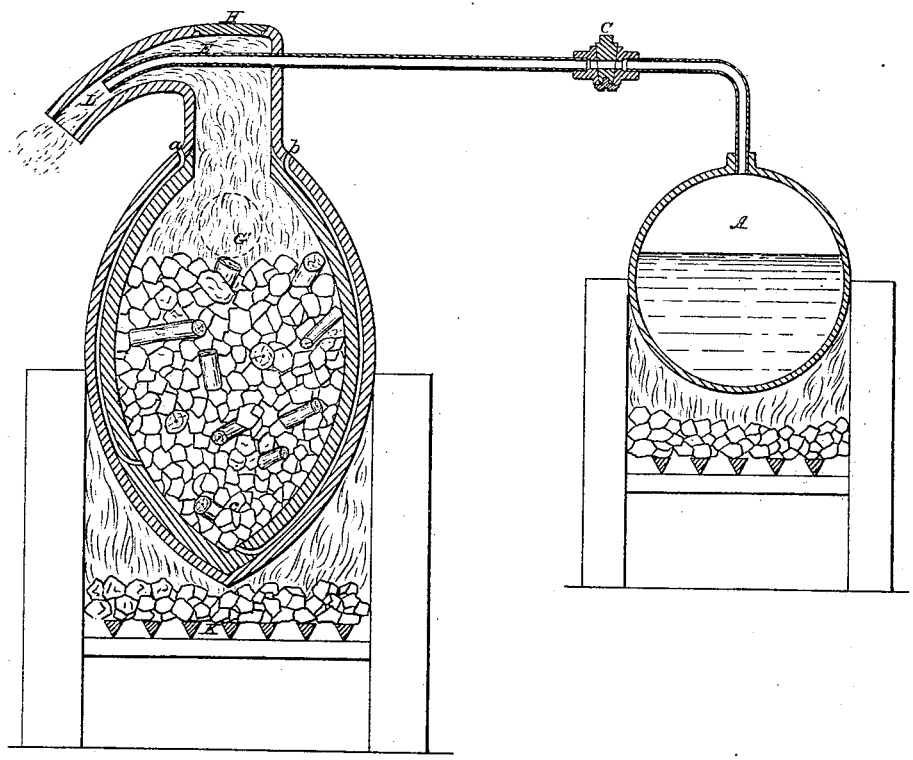

UNITED STATES PATENT OFFICE.

JOHN ABSTERDAM, OF NEW YORK, N. Y.

IMPROVED PROCESS FOR DESULPHURIZING ORES.

Specification forming part of Letters Patent No. 52,120, dated January 23, 1866.

*To all whom it may concern:*

Be it known that I, JOHN ABSTERDAM, of the city, county, and State of New York, have invented certain new and useful Improvements in the Process of Roasting and Smelting Metallic Ores *in Vacuo;* and I do hereby declare the same to be fully described in the following specification and the accompanying illustration, viz:

The nature of my invention consists, first, in roasting or smelting metallic ores in vacuo by creating and maintaining a vacuum within the retort or furnace containing the roasting or smelting ores, for the purpose of facilitating the extraction or dilatation of the different ingredients or impurities contained in the same; second, also in creating and maintaining a continuous vacuum within the interior of said retort or furnace, for the purpose of creating an equalized supply of air therein, thence an equalized heat for either smelting or roasting the ores under a very intense heat, in order to obtain a perfect separation of the different ingredients or impurities contained in the same; third, also in creating and maintaining a total vacuum within said retort or furnace containing said roasted or smelted ores, for the purpose of finally extracting all the different ingredients or impurities contained in said ores by distilling them *in vacuo.*

In order that my process may be well understood, I have made a diagram of an apparatus which may be practically employed in carrying out my invention, at the same time I do not confine my process to one particular shape or manner of constructing the apparatus that may be used for the same.

To enable others skilled in the art to make and use my invention, I will proceed to describe my process under its various manipulations.

I first provide myself with a retort or furnace capable of being closed air-tight, set in a grate-furnace, and provided with an exit-pipe for carrying off the gaseous product in the ordinary manner. I then introduce a steam-pipe in the interior of said exit-pipe, having its end in the direction of the mouth of said exit-pipe, as seen at E. This steam-pipe conveys a supply of steam from a steam boiler or generator, A, and is provided with a stop-cock, C, for regulating the flow of steam.

In order to carry out my invention I commence in filling the retort or furnace with small pieces of wood, sawdust, peat, turf, log, or coal, together with fragments of metallic ores in alternate layers. I afterward lute air-tight the man-hole plate H. I light the fire in the grate-furnace K, under the retort B, and as soon as gaseous vapors are issuing from the exit-pipe L, I open a little the stop-cock C and let on a small flow of steam in the interior of said exit-pipe, and after the contents of the retort have attained a red heat I let on a greater flow of steam, so as to produce a greater vacuum within the retort in order to distil the gaseous product *in vacuo*, and after the ores are roasted or reduced in this manner I withdraw all the contents from the retort, which consists of roasted or reduced ores and charcoal or coke, the gaseous product having been condensed and retained for illumination or combustion. But if the ores are of such a nature as to require a very intense heat for their roasting or reduction, then, instead of withdrawing the contents from the retort, I simply open the orifices *a b*, which had remained closed during the roasting of the ores in charring or coking the wood, peat, or coal, and let on a still greater pressure of steam in the exit-pipe, in order to cause a rapid current of air to pass through the red-hot mass in the interior of the retort, thereby burning away the charcoal or coke contained therein, the air entering, of its own accord, through the said orifices *a b*. In burning away the charcoal or coke so obtained in contact with the ores in the retort, I produce such an intense heat that I easily roast or reduce the ores that are of the most difficult nature of reducing or roasting, and in this manner, by simply continuing the operation, the ores may be smelted as well as roasted. When the ores are either roasted or smelted in this manner I also withdraw the contents of the retort, as in the previous operation, and introduce immediately another charge in the retort and continue again the operation, as before described.

If it should be desired, instead of introducing wood or coal, together with the ores in the retort, the ores may be introduced alone and afterward passing a stream or streams of some hydrocarbon vapor through the whole mass while the ores are red hot. In this case I dispense with the supply of air in the interior of the retort altogether, so as to prevent explosion.

The advantage of my process is as follows, viz:

First, in roasting or smelting ores containing substances capable of dilatation or evaporation by heat, I facilitate their extraction by distilling them *in vacuo*.

Second, in producing the blast required for reducing the ores by creating a vacuum within the retort, instead of forcing the air into it, as done in the ordinary way, I obtain a supply of air with an equalized pressure throughout the whole mass, thereby producing an equalized heat, which is a matter of great importance in smelting.

Third, in roasting iron ores with my process I impart a sufficient amount of carbon to the ore in depriving it of its oxygen, which enables me to melt said carbonized ore directly into cast-steel without any further process of cementation.

Fourth, in roasting or smelting copper ores I very easily divest them of their sulphur, phosphorus, and arsenic.

Fifth, in roasting ores of zinc, tin, lead, bismuth, antimony, &c., they may be roasted, smelted, and oxidized by my process in one single operation with great facility. This is a matter of considerable importance in treating those ores containing silver or gold, also for manufacturing metallic oxides.

Sixth, in smelting lead ores, where the gaseous vapors generated therefrom are now so deleterious to animal and vegetable life, with my process the whole steam and gas may be condensed together with any ordinary condenser and let the uncondensable air escape free from any poisonous substances.

Seventh, all smelting-works have very high chimneys for carrying the deleterious gases out into the atmosphere—a very expensive structure—which I dispense with altogether.

It is natural to understand from the above-described process that I connect a condenser to the exit-pipe when the gaseous products are to be condensed.

Having thus described my process, what I claim as my invention, and desire to secure by Letters Patent, is—

The within-described process of roasting or smelting metallic ores *in vacuo*, substantially as set forth.

In testimony whereof I have hereunto set my signature.

JOHN ABSTERDAM.

Witnesses:
A. SHEDLOCK,
A. NEILL.